(12) United States Patent
Sima et al.

(10) Patent No.: US 12,056,903 B2
(45) Date of Patent: Aug. 6, 2024

(54) GENERATOR, GENERATOR TRAINING METHOD, AND METHOD FOR AVOIDING IMAGE COORDINATE ADHESION

(71) Applicant: NANJING SILICON INTELLIGENCE TECHNOLOGY CO., LTD., Jiangsu (CN)

(72) Inventors: Huapeng Sima, Nanjing (CN); Maolin Zhang, Jiangsu (CN); Peiyu Wang, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/344,515

(22) Filed: Jun. 29, 2023

(65) Prior Publication Data
US 2024/0169592 A1 May 23, 2024

(30) Foreign Application Priority Data
Nov. 17, 2022 (CN) .......................... 202211438643.5

(51) Int. Cl.
*G06T 9/00* (2006.01)
*G06T 3/40* (2024.01)
(Continued)

(52) U.S. Cl.
CPC ................. *G06T 9/00* (2013.01); *G06T 3/40* (2013.01); *G06T 5/20* (2013.01); *G06V 10/44* (2022.01); *G06T 2207/10016* (2013.01)

(58) Field of Classification Search
None
See application file for complete search history.

(56) References Cited

U.S. PATENT DOCUMENTS 11,636,570 B2 * 4/2023 Zheng .................... G06V 10/82
345/428
11,838,734 B2 * 12/2023 Gui .......................... H04R 5/04
(Continued)

FOREIGN PATENT DOCUMENTS

CN 110070174 A 7/2019
CN 110880165 A 3/2020
(Continued)

OTHER PUBLICATIONS

Ioffe et al. "Batch Normalization: Accelerating Deep Network Training by Reducing Internal Covariate Shift", Proceedings of the 32nd International Conference on Machine Learning, Lille, France, 2015. JMLR: W&CP vol. 37 (Year: 2015).*

(Continued)

*Primary Examiner* — Randolph I Chu
(74) *Attorney, Agent, or Firm* — Harness, Dickey & Pierce, P.L.C.

(57) ABSTRACT

Disclosed are a gated network-based generator, a generator training method, and a method for avoiding image coordinate adhesion. The generator processes, by using an image input layer, a to-be-processed image as an image sequence and inputs it to a feature encoding layer. Multiple feature encoding layers encode the image sequence by using a gated convolutional network, to obtain an image code. Moreover, multiple image decoding layers decode the image code by using an inverse gated convolution unit, to obtain a target image sequence. Finally, an image output layer splices the target image sequence to obtain a target image. Therefore, a character feature in the obtained target image is more obvious, making details of a facial image of generated digital human more vivid, whereby solving a problem of image coordinate adhesion in a digital human image gener- (Continued)

ated by an existing generator using a generative adversarial network, and improving user experience.

5 Claims, 4 Drawing Sheets

(51) Int. Cl.
    *G06T 5/20*          (2006.01)
    *G06V 10/44*        (2022.01)

(56) References Cited

U.S. PATENT DOCUMENTS

| | | | | |
|---|---|---|---|---|
| 2020/0089998 | A1* | 3/2020 | Zagaynov | G06F 18/2148 |
| 2021/0125313 | A1* | 4/2021 | Bai | G06T 5/004 |
| 2021/0125338 | A1* | 4/2021 | Zhang | G06T 7/11 |
| 2021/0343305 | A1* | 11/2021 | Jin | G10L 21/0364 |
| 2022/0138913 | A1* | 5/2022 | Huang | G06V 10/62 |
| | | | | 348/241 |
| 2022/0301128 | A1* | 9/2022 | Liu | G06V 10/443 |
| 2023/0153965 | A1* | 5/2023 | Bai | G06V 10/761 |
| | | | | 382/254 |
| 2023/0197043 | A1* | 6/2023 | Martinez Ramirez | |
| | | | | G06N 3/084 |
| | | | | 381/61 |
| 2023/0281828 | A1* | 9/2023 | Du | G06T 1/20 |
| | | | | 382/157 |
| 2023/0296516 | A1* | 9/2023 | Dutta | G06N 3/08 |
| | | | | 250/459.1 |
| 2023/0316549 | A1* | 10/2023 | Zhang | G16H 30/20 |
| | | | | 382/294 |

FOREIGN PATENT DOCUMENTS

| | | |
|---|---|---|
| CN | 111783566 A | 10/2020 |
| CN | 111968053 A | 11/2020 |
| CN | 113191969 A | 7/2021 |
| CN | 113822428 A | 12/2021 |

OTHER PUBLICATIONS

L. Li and H. Kameoka, "Deep Clustering with Gated Convolutional Networks," 2018 IEEE International Conference on Acoustics, Speech and Signal Processing (ICASSP), Calgary, AB, Canada, 2018, pp. 16-20, doi: 10.1109/ICASSP.2018.8461746. (Year: 2018).*

He et al. "Dilated-Gated Convolutional Neural Network with A New Loss Function on Sound Event Detection", Proceedings of APSIPA Annual Summit and Conference 2019, Nov. 18-21, 2019 (Year: 2019).*

Zhang et al. "FurcaNeXt: End-to-end monaural speech separation with dynamic gated dilated temporal convolutional networks", arXiv:1902.04891 (Year: 2019).*

Chen et al. "Gated Context Aggregation Network for Image Dehazing and Deraining", 2019 IEEE Winter Conference on Applications of Computer Vision (Year: 2019).*

Tan et al. "Gated Residual Networks With Dilated Convolutions for Monaural Speech Enhancement", IEEE/ACM Transactions on Audio, Speech, and Language Processing, vol. 27, No. 1, Jan. 2019 (Year: 2019).*

Dauphin et al. "Language Modeling with Gated Convolutional Networks", arXiv:1612.08083v3 [cs.CL] Sep. 8, 2017 (Year: 2017).*

Zhang et al. "Human Pose Transfer by Adaptive Hierarchical Deformation", Pacific Graphics 2020, vol. 39 (2020), No. 7 (Year: 2020).*

Wadhwa et al. "Hyperrealistic Image Inpainting with Hypergraphs", arXiv:2011.02904v1 [cs.CV] Nov. 5, 2020 (Year: 2020).*

Jo et al., "SC-FEGAN: Face Editing Generative Adversarial Network with User's Sketch and Color", arXiv:1902.06838v1 [cs.CV] Feb. 18, 2019 (Year: 2019).*

Yu et al. "Free-Form Image Inpainting with Gated Convolution", arXiv:1806.03589 (Year: 2019).*

Chen et al. "Gated-GAN: Adversarial Gated Networks for Multi-Collection Style Transfer", IEEE Transactions on Image Processing (vol. 28, Issue: 2, Feb. 2019) (Year: 2019).*

Aldausari, et al. "Video Generative Adversarial Networks: A Review", ACM Computing Surveys, vol. 55, No. 2, Article 30. Publication date: Jan. 2022 (Year: 2022).*

Y.-L. Chang, Z. Y. Liu, K.-Y. Lee, and W. Hsu. 2019. Free-form video inpainting with 3D gated convolution and temporal patchGAN. In Proceedings of the IEEE/CVF International Conference on Computer Vision, 2019, pp. 9066-9075. (Year: 2019).*

K. Vougioukas, S. Petridis, and M. Pantic. 2018. End-to-end speech-driven facial animation with temporal GANs. arXiv preprint arXiv:1805.09313 (Year: 2018).*

T.-C. Wang, M.-Y. Liu, A. Tao, G. Liu, J. Kautz, and B. Catanzaro. 2019. Few-shot video-to-video synthesis. arXiv preprint arXiv:1910.12713. (Year: 2019).*

G. Mittal and B. Wang. 2020. Animating face using disent angled audio representations. In The IEEE Winter Conference on Applications of Computer Vision, 2020, pp. 3290-3298. (Year: 2020).*

L. Chen, Z. Li, R. K. Maddox, Z. Duan, and C. Xu. 2018. Lip movements generation at a glance. In Proceedings of the European Conference on Computer Vision (ECCV), 2018, pp. 520-535. (Year: 2018).*

S. A. Jalalifar, H. Hasani, and H. Aghajan. 2018. Speech-driven facial reenactment using conditional generative adversarial networks. arXiv preprint arXiv:1803.07461 (Year: 2018).*

Notification of Grant and Search Report mailed Jan. 13, 2023, in corresponding Chinese Application No. 202211438643.5.

Office Action and Search Report mailed Dec. 27, 2022, in corresponding Chinese Application No. 202211438643.5.

* cited by examiner

GENERATOR, GENERATOR TRAINING METHOD, AND METHOD FOR AVOIDING IMAGE COORDINATE ADHESION

CROSS-REFERENCE TO RELATED APPLICATION

The present disclosure claims the priority of a Chinese patent application No. 202211438643.5 filed on Nov. 17, 2022, the disclosure of which is hereby incorporated by reference herein in its entirety.

FIELD OF THE INVENTION

This application relates to the field of natural human-computer interactions, and in particular, to a generator, a generator training method, and a method for avoiding image coordinate adhesion.

BACKGROUND OF THE INVENTION

In the 2D digital human direction, a digital human video is basically generated by using a generative adversarial network, such as StyleGAN or CycleGAN. The generative adversarial network consists of two parts: a generator and a discriminator. Through adversarial training between the generator and the discriminator, an ideal model effect is obtained.

However, after analyzing a problem of coordinate adhesion in generating an image by using a StyleGAN3 network, it is found that the problem of coordinate adhesion is caused because a general generator network architecture adopts a configuration including a convolutional structure, a nonlinear structure and an upsampling structure, and such a configuration does not have good equivariance.

To resolve the foregoing problem, the generator usually use a StyleGAN3 network. The StyleGAN3 network is obtained by making significant adjustments to a generator network structure of StyleGAN2. Although it is claimed that this problem has been resolved in StyleGAN3, in practice, a model of StyleGAN3 is too complex and requires a lot of manual intervention. As a result, for an application scenario with high automation requirements, StyleGAN3 is difficult to be applied, and the technical problem of coordinate adhesion during generation of a facial video by using the generative adversarial network cannot be efficiently resolved.

SUMMARY OF THE INVENTION

Problems of blurring of a facial organ, hair, and other details of digital human, and lowered user experience during watching due to coordinate adhesion when a facial video of the digital human is generated by using a generative universal network are resolved.

According to a first aspect, some embodiments of this application provide a gated network-based generator, wherein the generator includes an image input layer, a feature encoding layer, a feature decoding layer, and an image output layer, wherein the image input layer is configured to process a to-be-processed image as an image sequence, and input the image sequence to the feature encoding layer; and the to-be-processed image includes at least one target character; the feature encoding layer is configured to encode the image sequence by using a gated convolutional network, to obtain an image code; the feature decoding layer is configured to decode the image code by using an inverse gated convolutional network, to obtain a target image sequence; and the image output layer is configured to splice the target image sequence to obtain a target image, and output the target image.

In an embodiment of this application, the gated convolutional network includes a feature filtering unit, a dilated convolution unit, and a normalization layer, wherein the feature filtering unit is configured to filter image features extracted from the image sequence, to obtain a filtering result; the dilated convolution unit is configured to perform convolution on the image feature according to a dilation parameter, to obtain a dilated convolution result, wherein the dilation parameter is a quantity of blank numerical values filled between numerical values corresponding to each image feature during the convolution of the dilated convolution unit; and the normalization layer is configured to normalize a product of the filtering result and the dilated convolution result, to obtain a normalized result.

In an embodiment of this application, the feature filtering unit includes a 2D convolution unit and an activation function; the 2D convolution unit is configured to filter deep-level features in the image feature; and the activation function is configured to introduce a nonlinear attribute in the deep-level feature, to obtain the filtering result.

In an embodiment of this application, the to-be-processed image includes at least one target character that performs a speaking action; and the generator further includes a first feature encoding region, a second feature encoding region, and an audio input layer, wherein the first feature encoding region and the second feature encoding region respectively include a preset quantity of feature encoding layers; the audio input layer is configured to extract an audio feature sequence of to-be-processed audio, and input the audio feature sequence to the second feature encoding region, wherein the to-be-processed audio is audio when the target character in the to-be-processed image performs the speaking action; the first feature encoding region is configured to encode the image sequence for a preset times by using the gated convolutional network; and the second feature encoding region is configured to merge, in a time sequence, the audio feature sequence and the image sequence that is encoded by the first feature encoding region, to obtain an image-audio sequence; and encode the image-audio sequence by using the gated convolutional network, to obtain a sample image-audio code.

In an embodiment of this application, the inverse gated convolutional network includes a difference sampling unit and a gated convolution unit; the difference sampling unit is configured to upsample and downsample an array in the image code according to a difference method, to obtain sampled data; and the gated convolution unit is configured to output the sampled data.

According to a second aspect, some embodiments of this application provide a generator training method, for training any gated network-based generator according to the first aspect, wherein the method includes: extracting a sample image from a sample video, wherein the sample video is a video when a preset character speaks according to preset speechcraft, and the sample image is an image corresponding to at least one frame in the sample video; preprocessing the sample image to obtain a sample image sequence; inputting the sample image sequence into an untrained generator for encoding by using a gated convolutional network, to obtain a sample image code; decoding the sample image code by using an inverse gated convolutional network, to obtain a training image sequence;

splicing the training image sequence to obtain a training image; and calculating an image deviation between the sample image and the training image based on a loss function, and obtaining a trained generator if the image deviation is less than a deviation threshold.

In an embodiment of this application, the step of the calculating an image deviation between the sample image and the training image based on a loss function includes: obtaining a predicted label of the sample image; obtaining an actual label of the training image; calculating a deviation between the actual label and the predicted label; and updating a parameter of the generator based on the deviation by using an adaptive moment estimation algorithm.

In an embodiment of this application, the method further includes: taking a quantity of sample images that satisfy a preset ratio as a test set; inputting the test set into the trained generator to obtain a loss value fed back by the loss function; iteratively training the generator if the loss value is greater than a loss threshold; and obtaining the trained generator if the loss value is less than the loss threshold.

In an embodiment of this application, the method further includes: extracting sample audio from the sample video, where the sample audio is corresponding audio when the preset character in the sample image performs the preset speechcraft; preprocessing the sample audio to obtain a sample audio sequence; merging the sample audio sequence and the sample image sequence to obtain sample image-audio data; encoding the sample image-audio data by using the gated convolutional network, to obtain a sample image-audio code; decoding the sample image-audio code by using the inverse gated convolutional network, to obtain a training image-audio sequence; and splicing the training image-audio sequence to obtain a training audio and image.

According to a third aspect, some embodiments of this application further provide a method for avoiding image coordinate adhesion, applied to a generator trained by using any training method according to the second aspect, wherein the method includes: obtaining a to-be-processed image, wherein the to-be-processed image includes at least one target character; preprocessing the to-be-processed image to obtain an image sequence; encoding the image sequence by using a gated convolutional network, to obtain an image code; decoding the image code by using an inverse gated convolutional network, to obtain a target image sequence; and splicing the target image sequence to obtain a target image.

It can be learned from the foregoing technical solutions that this application provides a gated network-based generator, a generator training method, and a method for avoiding image coordinate adhesion. The generator processes the to-be-processed image as the image sequence by using the image input layer, and inputs the image sequence to the feature encoding layer. The image sequence is encoded by a plurality of feature encoding layers by using the gated convolutional network, to obtain the image code. Moreover, the image code is decoded by a plurality of image decoding layers by using an inverse gated convolution unit, to obtain the target image sequence. Finally, the target image sequence is spliced by the image output layer to obtain the target image. After the to-be-processed image is processed by using the gated convolutional network and the inverse gated convolutional network, a character feature in the obtained target image is more obvious, making details of a facial image of generated digital human more vivid. In this way, a problem of image coordinate adhesion in a digital human image generated by an existing generator by using a generative adversarial network is resolved, and user experience is improved.

BRIEF DESCRIPTION OF THE DRAWINGS

To more clearly describe the technical solutions of this application, the accompanying drawings to be used in the embodiments are briefly illustrated below. Obviously, persons of ordinary skills in the art can also derive other accompanying drawings according to these accompanying drawings without an effective effort.

DETAILED DESCRIPTION OF THE EMBODIMENTS

This application is described below in detail with reference to the accompanying drawings and in combination with the embodiments. It should be noted that the embodiments in this application and the features in the embodiments can be combined with each other in the case of no conflict.

It should be noted that the terms "first", "second", and the like in this specification, the claims, and the accompanying drawings of this application are intended to distinguish between similar objects, but are not necessarily intended to describe a particular sequence or a sequential order.

Digital human is a product obtained by combining the information science and the life science, which specifically refers to generation of a visual virtual character by performing virtual simulation on a body shape, appearance, and actions of a real character through the information science and technology. A body of the digital human is generated by using a computer, and is presented through a display device, allowing people to see through eyes. The digital human has appearance and behavioral patterns of human. The digital human has the appearance physical structure of a human body, and presented behavioral patterns are similar to those of human. A video of the digital human usually presents a human activity.

Digital human is divided into 2D digital human and 3D digital human. In the 2D digital human direction, a digital human video is basically generated by using a generative adversarial network, such as StyleGAN or CycleGAN. The generative adversarial network consists of two parts: a generator and a discriminator. Through adversarial training between the generator and the discriminator, an ideal model effect is obtained.

A general generator network architecture adopts a convolutional structure, a nonlinear structure, an upsampling structure, or the like, and such structures do not have good equivariance. Therefore, the generative adversarial network may encounter a problem of image coordinate adhesion when generating a corresponding frame of digital human image, which leads to those facial details, especially in terms of hair, of the generated digital human are not vivid enough. The coordinate adhesion can cause adhesion to the hair of the generated digital human, resulting in blurry whiskers, hair, and eyebrows of the digital human.

Figure 1:
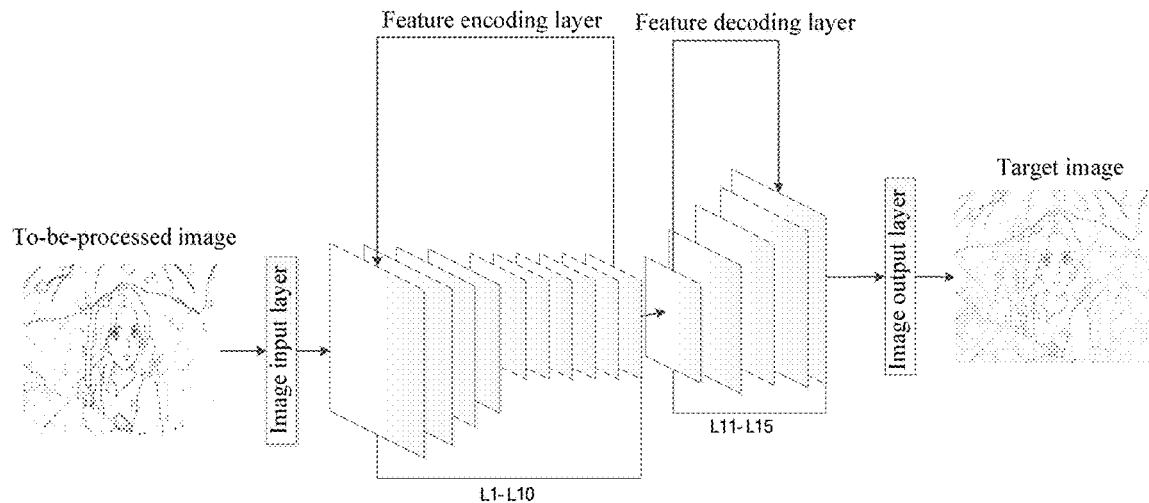
FIG. 1 is a structural diagram of a gated convolutional network-based generator according to an embodiment of this application.

To resolve problems of blurring of a facial organ, hair, and other details of the digital human, and reduced user experience during watching due to coordinate adhesion when a facial video of the digital human is generated by using the generative universal network, an embodiment of this application provides a gated network-based generator. As shown in FIG. 1, the generator includes an image input layer, a feature encoding layer, a feature decoding layer, and an image output layer. Because the generator cannot directly process a picture, the image input layer in the generator is configured to process a to-be-processed image as an image sequence, and input the image sequence to the feature encoding layer for further encoding by using a gated convolutional network.

In the generator, the image input layer has a function of transmitting the image sequence. In some embodiments, if the to-be-processed image has been processed as an image sequence before being input to the generator, the image sequence can be directly input to the feature encoding layer by the image input layer for encoding.

In some embodiments, the to-be-processed image can be captured from a video with a large number of frames of images. Therefore, during a process of inputting an image to the generator, a user can choose to input only one image at a time, or can input a plurality of images to the generator in batches. However, a quantity of images cannot exceed a maximum quantity of images that can be processed by the generator.

In this embodiment, the generator needs to generate digital human based on content in the image. Therefore, the to-be-processed image includes at least one target character. The target character is a character corresponding to an image of the digital human to be generated. The generator can also include an image recognition layer that is configured to recognize each character separately when there are a plurality of characters in the to-be-processed image, and select, based on a selection instruction sent by the user, the corresponding character to serve as the target character for generating the digital human.

In some embodiments, there may be no target character in the to-be-processed image. The generator is configured to only process image details in the to-be-processed image, such as tree shades and water streaks in a landscape image, and feathers and hair in an animal image. Further, the target character usually refers to digital human. The digital human is obtained by simulating a real person, and has relatively high similarity with the real person. Therefore, the target character can also be a real person in reality.

In the generator, the feature encoding layer is configured to encode, by using a gated convolutional network, the image sequence input by the image input layer, to obtain an image code. The feature encoding layer extracts detailed features in the image sequence, and filters out unimportant features to preserve important features in the image sequence. In this way, the problem of coordinate adhesion in the generated image is resolved, making details in a digital human image clearer.

Referring to FIG. 1, in some embodiments, the generator can also be provided with a plurality of feature encoding layers, to extract features of the image sequence layer by layer, and encode the image sequence by using the gated convolutional network. After the image sequences are input to the feature encoding layer, every time the image sequence passes through one feature encoding layer, important features are extracted at a deeper level on the basis of an original sequence. According to this embodiment, character features in the image sequence can be optimized and refined in a hierarchical manner, to generate a digital human image with higher definition and better details.

In some embodiments, when the image sequence is processed by a plurality of feature encoding layers, a discriminator that is adverse to the generator can also obtain an encoded image processed by all the feature encoding layers, and compare the encoded image with a standard digital human image to obtain a discrimination result. If the discrimination result meets requirements, it indicates that the encoded image at this time can resolve the problem of coordinate adhesion, and a target image that meets requirements on clarity can be obtained after encoding. In this case, the generator can skip remaining feature encoding layers based on the discrimination result, and directly input an image sequence corresponding to the current encoded image to the feature decoding layer for decoding by using an inverse gated convolutional network.

In some embodiments, as shown in FIG. 1, the generator has a total of 10 feature encoding layers. Each feature encoding layer performs processing by using a gated convolutional network. The gated convolutional network includes a feature filtering unit, a dilated convolution unit, and a normalization layer. The feature filtering unit can filter image features extracted from the image sequence, to obtain a filtering result. In this embodiment, the feature filtering unit first traverses all the image features extracted from the image sequence by the feature encoding layer. The foregoing image features are extracted from the input to-be-processed image, including character features and environmental features.

After all the extracted image features are traversed, the feature filtering unit first filters out the extracted environmental features while preserving the character features, thereby improving generation accuracy of the digital human image. After the environmental features are filtered out, the feature filtering unit can continue to traverse the preserved character features, and filter and sort the character features according to importance. Subsequently, based on a sorting result, a preset quantity of character features at an end of a sorting order are filtered out, and character features with higher importance are preserved preferentially.

Figure 2:
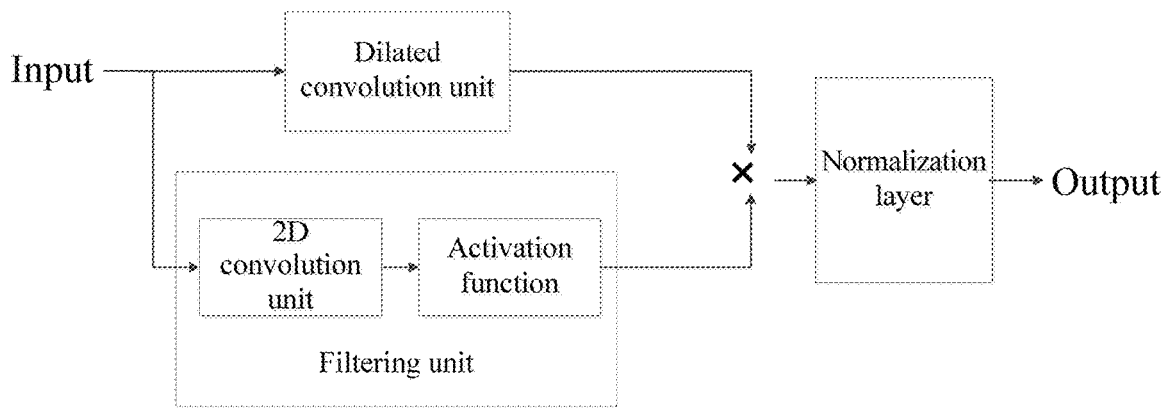
FIG. 2 is a structural diagram of a gated convolutional network according to an embodiment of this application.

As shown in FIG. 2, the feature filtering unit further includes a 2D convolution unit and an activation function. A main function of the 2D convolution unit is to perform the filtering operation in the foregoing embodiment. A 2D convolution process is a process of multiplying a pixel value in the image sequence by numerical values in a corresponding convolution kernel by using sliding of the convolution kernel on the image sequence, and then adding all values obtained by multiplication to serve as grayscale values of a pixel on an image corresponding to a middle pixel of the convolution kernel, and finally, sliding all of the image sequence.

The 2D convolution process is a result obtained by adding after multiplication. For example, if a 3×3 convolution kernel is selected for convolution, there are nine numerical values in the convolution kernel in total. The numerical value in the convolution kernel is multiplied by the pixel value of the image. Sliding is performed along the image sequence with a step of 1, and each time of sliding is a process of multiplication and addition. In this way, a deep-level feature in the image feature is extracted.

After the deep-level feature is obtained, a nonlinear attribute is further required to be introduced into the deep-level feature through the activation function, thereby achieving an objective of de-linearization and having a capability for an output of a previous layer to serve as an input of a next layer. In this way, a final output result can be obtained, to obtain the filtering result.

In this embodiment, the activation function may be a tanh activation function, a ReLu activation function, or a Sigmoid activation function. The Sigmoid activation function can transform continuous input real values into outputs between 0 and 1. Particularly, if the real value is a very large negative number, 0 is output; and if the real value is a very large positive number, 1 is output.

The dilated convolution unit in the gated convolutional network is configured to perform convolution on the image feature according to a dilation parameter, to obtain a dilated convolution result. The dilation parameter is a quantity of blank numerical values filled between numerical values corresponding to each image feature when the dilated convolution unit performs convolution on the image feature.

Figure 3:
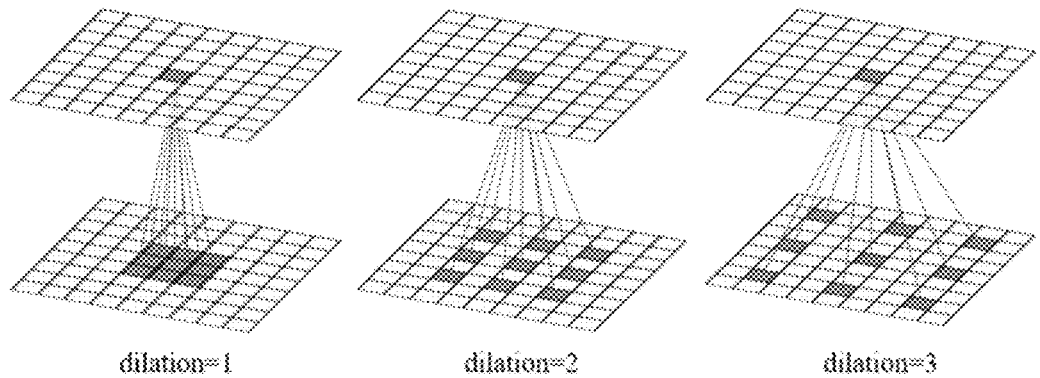
FIG. 3 is a schematic diagram of a perception range of a dilated convolution unit according to an embodiment of this application.

FIG. 3 shows scenarios in which the dilated convolution unit performs convolution according to three different dilation parameters. In addition, in FIG. 3, there is a parameter dilation, and a function thereof is to dilate the convolution kernel. When it is satisfied that dilation=n, it means that a dilated convolution kernel may fill n−1 blank numerical values between numerical values processed during dilation convolution, which can also be understood as a distance value between the numerical values corresponding to the image feature. The dilation parameter can be equivalent to dilution−1.

In FIG. 3, dilation parameters are 1, 2, and 3 from left to right. It can be clearly seen that when the dilation parameter is 1, a range perceived by the image feature is the smallest, which falls within a dilated convolution kernel of 3×3. When the dilation parameter is 2, a range perceived by the image feature is greater than the range perceived when the dilation parameter is 1, being a perception range of 5×5. When the dilation parameter is 3, a range perceived by the image feature is the largest, being a perception range of 7×7.

It should be noted that corresponding to different dilation parameters, different perception ranges may be generated for the input image feature, and therefore a range for extracting the deep-level feature also changes. A larger dilation parameter indicates a larger perception field of the dilated convolution kernel, and a larger data range of the numerical value corresponding to the image feature that can be covered.

As shown in FIG. 2, the normalization layer in the gated convolutional network is configured to normalize a product of the filtering result and the dilated convolution result, to obtain a normalized result. Main functions of the normalization layer are to avoid gradient disappearance and gradient explosion in a process of extracting the image feature by using the gated convolutional network; to avoid overfitting; and to convert, to a certain extent, the numerical value corresponding to the image feature in the gated convolution unit to a mean value of 0 and a variance of 1 through normalization, thereby improving a training speed.

Further, in the foregoing embodiment, another activation function can be added at the normalization layer to further introduce the non-linear attribute, thereby removing linearization.

In some embodiments, ten feature encoding layers in FIG. 1 can also be defined as L1-L10 in sequence. For feature encoding layers at different positions, different dilation parameters are set for convolution. For example, the dilation parameters in the last three feature encoding layers, that is, L8, L9, and L10, can be set to 1, 3, and 7, respectively, while the dilation parameters of other feature encoding layers can be set to 0, that is, regular dilated convolution kernels are used in the other feature encoding layers. In this way, different encoding effects are achieved.

A result of generating the digital human is usually a digital human video, which includes not only a character image of the digital human, but also a speaking action of the digital human and audio when the digital human speaks. In some embodiments, the to-be-processed image includes at least one target character that performs a speaking action. The generator further includes a first feature encoding region and a second feature encoding region. The first feature encoding region encodes only the image sequence input to the generator. The second feature encoding region encodes an audio feature sequence and the image sequence together after the audio feature sequence is input.

In some embodiments, the generator further includes an audio input layer that is configured to extract to-be-processed audio from a material video, process the to-be-processed audio as an audio feature sequence, and then input the audio feature sequence to the second feature encoding region. The to-be-processed audio is audio when the target character in the to-be-processed image performs the speaking action. The to-be-processed audio can alternatively be audio pre-recorded by using a terminal device with a recording function, or be audio recorded in a real-time manner by turning on an audio input device of the terminal device. In this embodiment, because different generations have different degrees of adaptation to an audio format, the generator can also process the input to-be-processed audio in a unified format, to resolve failed adaptation caused by that the audio input layer inputs different formats of audio.

Figure 4:
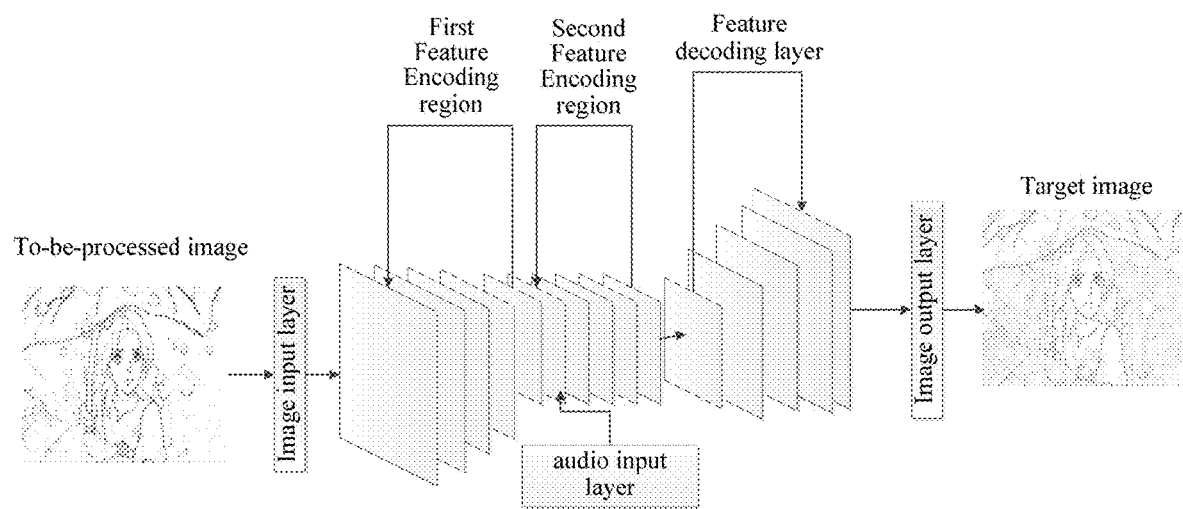
FIG. 4 shows a gated convolutional network-based generator according to another embodiment of this application.

The audio feature sequence can be input at any position in the feature encoding layer, including a feature encoding layer at a first position or a feature encoding layer at a last position. Referring to FIG. 4, in FIG. 4, if the audio input layer inputs the to-be-processed audio at a feature encoding layer of L6, L1-L5 are the first feature encoding region, and L6-L10 are the second feature encoding region. The first feature encoding region and the second feature encoding region respectively include a preset quantity of feature encoding layers. A sum of the quantities of the feature encoding layers in the first feature encoding region and the second feature encoding region is equal to a total quantity of the feature encoding layers in the generator.

In this embodiment, the first feature encoding region is configured to encode the image sequence for a preset times by using the gated convolutional network. The foregoing preset quantity is the quantity of the feature encoding layers in the first feature encoding region. Due to different input positions of the to-be-processed audio, the quantity of the feature encoding layers in the first feature encoding region varies with the input position of the to-be-processed audio.

Because the audio feature sequence is input, to process the audio feature sequence and the image sequence at the same time and save encoding time, in some embodiments, the second feature encoding region is configured to merge, in a time sequence, the audio feature sequence and the image sequence that is encoded by the first feature encoding region, to obtain an image-audio sequence; and encode the image-audio sequence by using the gated convolutional network, to obtain a sample image-audio code.

The speaking action in the to-be-processed image is performed in a time sequence, and the audio when the target character performs the speaking action is also performed in a time sequence. Therefore, in the process of merging the image sequence and the audio feature sequence, it is required to strictly follow the time sequence for merging, thereby avoiding inconsistent image and audio between the speaking action and audio corresponding to the speaking action, which affects user experience.

In some embodiments, the dilation parameter of the feature encoding layer in the second feature encoding region can also be set to be greater than that of other feature encoding layers. Moreover, the feature encoding layer disposed at a later position has a larger dilation parameter. For example, when the second feature encoding region is L8-L10, the dilation parameters of the feature encoding layers of L8, L9, and L10 are respectively set to 2, 4, and 8. Moreover, the dilation parameters of the other layers are all set to 1. In other words, regular dilated convolution kernels are used in the other layers. In this embodiment, the second feature encoding region is L8-L10. In other words, the audio feature sequence is input at a position of the feature encoding layer of L8. Therefore, after the image-audio sequence is obtained through merging at the position of the feature encoding layer of L8, increasing the dilation parameter can greatly increase a perception field for extracting features in the image-audio sequence. It is equivalent to that more contextual information is added in a time sequence, thereby improving accuracy of extracting data features.

Figure 5:
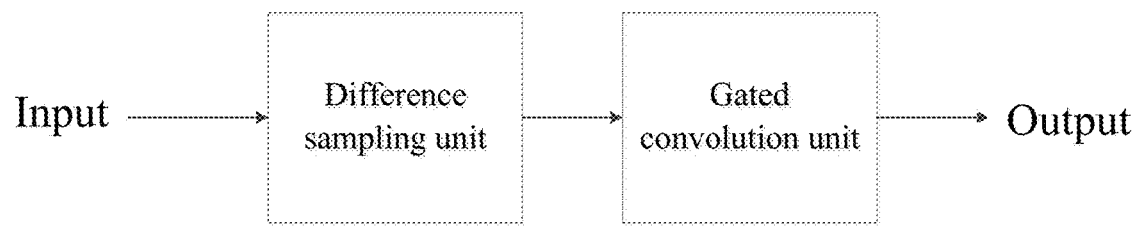
FIG. 5 is a structural diagram of an inverse gated convolutional network according to an embodiment of this application.

The feature decoding layer of the generator is configured to decode the image code obtained in the foregoing encoding process by using an inverse gated convolutional network, to obtain a target image sequence. The target image sequence is an image sequence for which the problem of image coordinate adhesion is resolved. In FIG. 1, L11-L15 are image decoding layers, with a total of 5 layers. The inverse gated convolutional network in each layer includes a difference sampling unit and a gated convolution unit. As shown in FIG. 5, the difference sampling unit is configured to perform an upsampling operation and a downsampling operation on an array in the image code according to a difference method, to obtain sampled data. The gated convolution unit is configured to output the sampled data.

The upsampling operation and the downsampling operation in the foregoing embodiment need to be performed based on given output magnitude and a multiple relationship between output and input. Currently, input formats that support the upsampling operation and downsampling operation are temporal (1D, such as vector data), spatial (2D, such as image data in jpg or png), and volumetric (3D, such as point cloud data). A format of input data is minibatch× channels×[optional depth]×[optional height]×width, and the like.

Currently, available upsampling algorithms include "nearest", "linear", "bilinear", "bicubic", "trilinear", and "area", with "nearest" being used by default.

When the difference sampling unit performs the upsampling operation on the array by using the difference method, pixels in an output image code and in an input image code may not be aligned proportionally. Therefore, an output value can depend on given input magnitude. To be specific, the difference sampling unit modifies data with an original size to data with another size by changing a size of the array and by using a linear difference method. For example, a size of 1920×1080 is modified to a size of 3840×2160 by using the linear difference method, to increase resolution of the target image sequence and expand a data dimension of the target image sequence, thereby resolving the problem of image coordinate adhesion.

Finally, the image output layer is configured to splice the target image sequence to obtain a target image, and output the target image. In FIG. 1, compared with a to-be-processed image that has not been input into the generator, the obtained target image has clearer details, and the problem of image coordinate adhesion is resolved.

Figure 6:
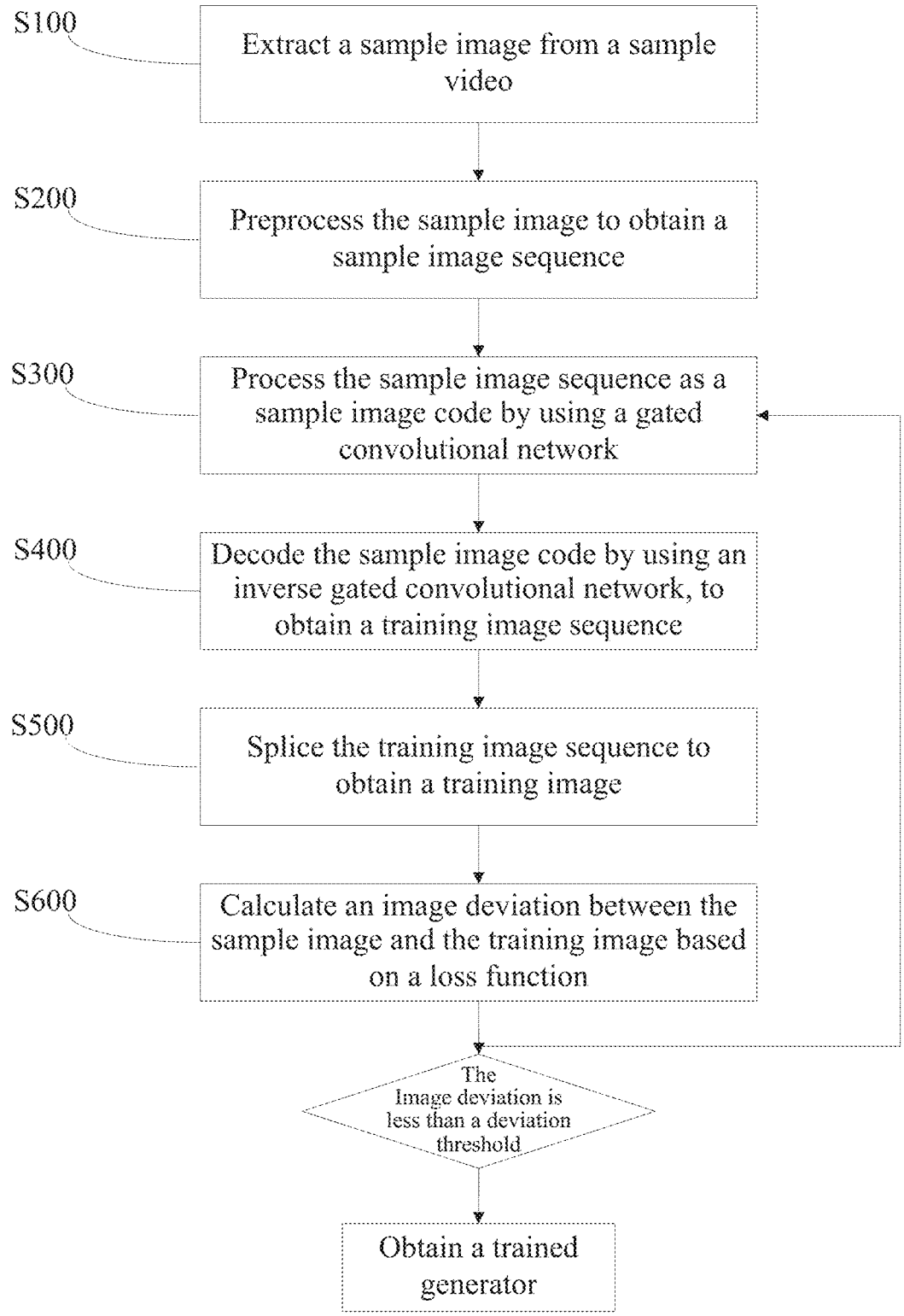
FIG. 6 is a flowchart of a generator training method according to an embodiment of this application.

In practical application, to achieve the technical effects of the foregoing model in the foregoing application, a specific training process needs to be performed on the model. For this reason, the gated network-based generator provided in the foregoing embodiments can further be trained through a generator training method provided in this embodiment. As shown in FIG. 6, the method includes the following steps.

S100: Extract a sample image from a sample video, where the sample video is a video when a preset character speaks according to preset speechcraft, and the sample image is an image corresponding to at least one frame in the sample video. To better train the generator, a large quantity of sample images need to be prepared. The quantity of the sample images can be determined based on duration of the sample video. Longer duration of the sample video indicates more sample images that can be extracted by using frame as a unit.

S200: Preprocess the sample image to obtain a sample image sequence.

In this embodiment, sample images to be input to the generator can be classified into batches. For example, the sample images are evenly classified into a first quantity of batches, a second quantity of batches, and a third quantity of batches. Moreover, according to the foregoing quantities of batches, the sample images of the corresponding batches are preprocessed into sample image sequences in batches.

S300: Input the sample image sequence into an untrained generator for encoding by using a gated convolutional network, to obtain a sample image code.

S400: Decode the sample image code by using an inverse gated convolutional network, to obtain a training image sequence.

S500: Splice the training image sequence to obtain a training image.

The beneficial technical effects of steps S300-S500 are the same as the beneficial effects disclosed in the corresponding part of the generator described above, and details are not described herein again. The steps S300-S500 are used to participate in the training of the generator. Specifically, the sample image sequence is encoded by using the gated convolutional network, and the sample image code is decoded by using the inverse gated convolutional network. Differences are that an object is the sample image sequence, and the training image is input finally.

S600: Calculate an image deviation between the sample image and the training image based on a loss function, and obtain a trained generator if the image deviation is less than a deviation threshold.

In the foregoing embodiment, if the image deviation calculated based on the loss function is greater than the deviation threshold, it indicates that the training image is not as clear as the sample image in terms of character details, and still has a problem of coordinate adhesion. In this case, the generator needs to be trained again until the generator converges. When the image deviation is less than the deviation threshold, the trained generator is obtained.

In some embodiments, to better determine whether the generator has converged, step S600 can be evolved into the following steps:

S601: Obtain a predicted label of the sample image. The predicted label contains elements such as a level of interest, preferences, and requirements of a user to the sample image. For example, based on digital human in the current sample image, the user can customize a part that is preset to be optimized, such as unclear hair due to adhesion, a pupil detail, or a facial expression.

S602: Obtain an actual label of the training image. The actual label is any numerical label of the generated training image, such as clarity of the training image, or an optimization degree of the facial detail.

S603: Calculate a deviation between the actual label and the predicted label after the predicted label and the actual label are obtained. Various numerical values in the current training image that do not conform to the predicted label, that is, various numerical values that do not meet expectations of the user in the process of training the generator are obtained.

S604: Update a parameter of the generator based on the deviation by using an adaptive moment estimation algorithm. In the process of updating the parameter, the numerical values corresponding to the predicted label needs to be considered. Based on the deviation, corresponding project data is adjusted towards a direction close to the predicted label. The project data is adjusted to be smaller when being greater than a corresponding number of the predicted label, and is adjusted to be greater when being smaller than the corresponding number of the predicted label. Finally, based on the adjusted parameter, the generator is updated and is performed with iterative training, until the generator converges.

In some embodiments, to test the training of the generator, the method further includes the following steps.

S701: Take a quantity of sample images that satisfy a preset ratio as a test set.

For example, the sample images are classified into a training set and a test set in a ratio of 8:2. For example, if there are 1000 sample images, 800 sample images are used as the training set, and the remaining 200 sample images are used as the test set.

S702: After the generator is trained once, input the test set into the trained generator to obtain a loss value fed back by the loss function. The loss value is used to indicate an image loss between the training image obtained after this training and a standard image.

It should be noted that the standard image is a high-precision image for which the problem of image coordinate adhesion has been resolved, is generated by another trained generator, and is used to reflect a convergence situation of the current generator.

S703: If the loss value is greater than a loss threshold, it indicates that after this training, the training image generated by the generator still cannot meet output accuracy of the standard image, and training of the generator is not completed, whereby iterative training needs to be performed on the generator.

S704: If the loss value is less than the loss threshold, it indicates that after this training, the training image generated by the generator can meet the output accuracy of the standard image, and a problem of image coordinate adhesion can be avoided. In this case, the training of the generator is completed to obtain the trained generator.

In some embodiments, when training the generator, sample audio also needs to be trained synchronously. The method further includes the following steps:

S801: Extract sample audio from the sample video, where the sample audio is corresponding audio when the preset character in a sample image performs the preset speechcraft.

S802: Preprocess the sample audio to obtain a sample audio sequence.

S803: Merge the sample audio sequence and the sample image sequence to obtain sample image-audio data.

S804: Encode the sample image-audio data by using the gated convolutional network, to obtain a sample image-audio code.

S805: Decode the sample image-audio code by using the inverse gated convolutional network, to obtain a training image-audio sequence.

S806: Splice the training image-audio sequence to obtain a training audio and image.

The beneficial technical effects of steps S801-S806 are the same as the beneficial effects disclosed in the corresponding part of the generator described above, and details are not described herein again. The foregoing embodiments are only used for the process of training the generator. In steps S801-S804, the sample audio and the sample image are extracted respectively, the sample audio and the sample image are processed as the sample audio sequence and the sample image sequence, the sample audio sequence and the sample image sequence are merged and then are encoded to obtain the sample image-audio code, and subsequent training processing is performed.

Figure 7:
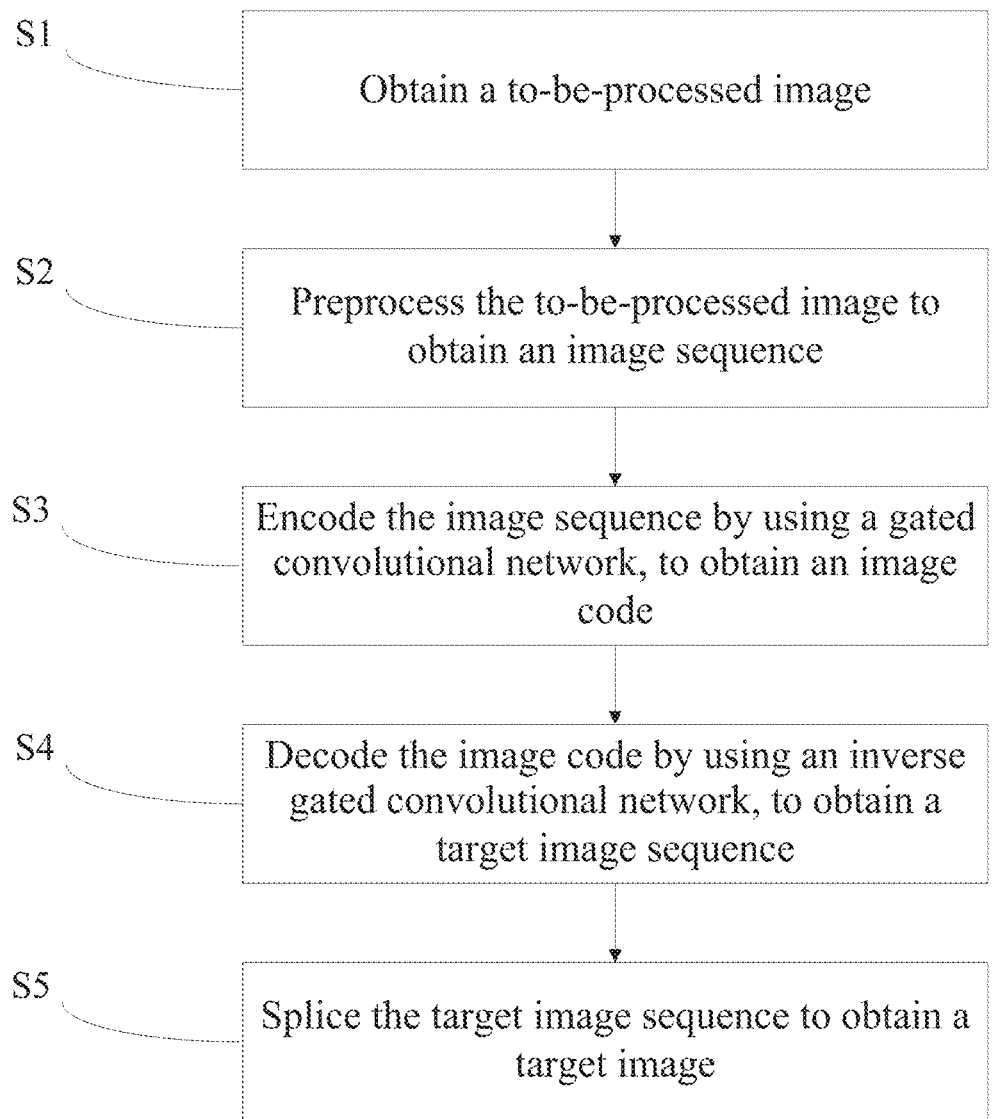
FIG. 7 is a flowchart of a method for avoiding image coordinate adhesion according to an embodiment of this application.

Some embodiments of this application further provide a method for avoiding image coordinate adhesion, applied to a generator trained by using the foregoing training method. Meanwhile, the method provided in the embodiments can also be applied to the generator disclosed in the foregoing embodiments. As shown in FIG. 7, the method includes the following steps:

S1: Obtain a to-be-processed image, where the to-be-processed image includes at least one target character.

S2: Preprocess the to-be-processed image to obtain an image sequence.

S3: Encode the image sequence by using a gated convolutional network, to obtain an image code.

S4: Decode the image code by using an inverse gated convolutional network, to obtain a target image sequence.

S5: Splice the target image sequence to obtain a target image.

In the embodiments of this application, for the technical effects corresponding to the method for avoiding image coordinate adhesion, refer to description of the gated network-based generator described above. Details are not described herein again.

It can be learned from the foregoing solutions that this application provides a gated network-based generator, a generator training method, and a method for avoiding image coordinate adhesion. The generator processes the to-be-processed image as the image sequence by using the image input layer, and inputs the image sequence to the feature encoding layer. The image sequence is encoded by a plurality of feature encoding layers by using the gated convolutional network, to obtain the image code. Moreover, the image code is decoded by a plurality of image decoding layers by using an inverse gated convolution unit, to obtain the target image sequence. Finally, the target image sequence is spliced by the image output layer to obtain the target image. After the to-be-processed image is processed by using the gated convolutional network and the inverse gated convolutional network, the character feature in the obtained target image is more obvious, making details of a facial image of the generated digital human more vivid. In this way, a problem of image coordinate adhesion in a digital human image generated by an existing generator by using the generative adversarial network is resolved, and user experience is improved.

The terms "a plurality of embodiments", "some embodiments", "one embodiment", or "embodiment" mentioned throughout this specification mean that specific features, components or feature described in combination with the embodiments is included in at least one embodiment. Therefore, the phrases such as "in a plurality of embodiments", "in some embodiments", "in at least one another embodiment", or "in an embodiment" that appear throughout this specification may not necessarily refer to same embodiments. In addition, in one or more embodiments, specific features, components, or features can be combined in any suitable manner. Therefore, without limitation, specific features, components, or features illustrated or described in combination with one embodiment can be entirely or partially combined with features, components, or features of one or more other embodiments. Such modification and variation are intended to fall within the scope of this application.

For similar parts between the embodiments provided in this application, reference can be made to each other. The specific implementations described above are merely some examples under a general concept of this application, and do not constitute any limitation to the protection scope of this application. For a person skilled in the art, any other implementations derived according to the solutions of this application without an effective effort all fall within the protection scope of this application.

Merely preferred implementations of this application are described above. It should be noted that for persons of ordinary skills in the art, improvements and modifications can be made without departing from the principles of this application, and these improvements and modifications should also be considered as being subject to the protection scope of this application.

What is claimed is:

1. A generator training method, for training a gated network-based generator, wherein the method comprises:
   extracting a sample image from a sample video, wherein the sample video is a video when a preset character speaks according to preset speechcraft, and the sample image is an image corresponding to at least one frame in the sample video;
   preprocessing the sample image to obtain a sample image sequence;
   inputting the sample image sequence into an untrained generator for encoding by using a gated convolutional network, to obtain a sample image code;
   decoding the sample image code by using an inverse gated convolutional network, to obtain a training image sequence;
   splicing the training image sequence to obtain a training image; and
   calculating an image deviation between the sample image and the training image based on a loss function, and obtaining a trained generator if the image deviation is less than a deviation threshold.

2. The generator training method according to claim 1, wherein calculating an image deviation between the sample image and the training image based on a loss function comprises:
   obtaining a predicted label of the sample image;
   obtaining an actual label of the training image;
   calculating a deviation between the actual label and the predicted label; and
   updating a parameter of the generator based on the deviation by using an adaptive moment estimation algorithm.

3. The generator training method according to claim 1, wherein the method further comprises:
   taking a quantity of sample images that satisfy a preset ratio as a test set;
   inputting the test set into the trained generator to obtain a loss value fed back by the loss function;
   iteratively training the generator if the loss value is greater than a loss threshold; and
   obtaining the trained generator if the loss value is less than the loss threshold.

4. The generator training method according to claim 1, wherein the method further comprises:
   extracting sample audio from the sample video, wherein the sample audio is corresponding audio when the preset character in the sample image performs the preset speechcraft;
   preprocessing the sample audio to obtain a sample audio sequence;
   merging the sample audio sequence and the sample image sequence to obtain sample image-audio data;
   encoding the sample image-audio data by using the gated convolutional network, to obtain a sample image-audio code;
   decoding the sample image-audio code by using the inverse gated convolutional network, to obtain a training image-audio sequence; and
   splicing the training image-audio sequence to obtain a training audio and image.

5. A method for avoiding image coordinate adhesion, applied to a generator trained by using the training method according to claim 1, wherein the method comprises:
   obtaining a to-be-processed image, wherein the to-be-processed image comprises at least one target character;
   preprocessing the to-be-processed image to obtain an image sequence;
   encoding the image sequence by using a gated convolutional network, to obtain an image code;
   decoding the image code by using an inverse gated convolutional network, to obtain a target image sequence; and
   splicing the target image sequence to obtain a target image.

* * * * *